United States Patent

Ries et al.

[15] 3,640,690

[45] Feb. 8, 1972

[54] WELDED STEEL ARTICLES BONDED BY A STEEL ALLOY

[72] Inventors: Gerald D. Ries, Barberton; Sidney W. Poole, Broadview Heights, both of Ohio

[73] Assignee: Republic Steel Corporation, Cleveland, Ohio

[22] Filed: Nov. 21, 1968

[21] Appl. No.: 777,880

Related U.S. Application Data

[63] Continuation-in-part of Ser. No. 525,348, Feb. 7, 1966, abandoned.

[52] U.S. Cl. .................................................29/196.1
[51] Int. Cl. ..................................................B32b 15/00
[58] Field of Search .......................................29/196.1

[56] References Cited

UNITED STATES PATENTS 2,770,030   11/1956   Carpenter ...........................29/196.1
3,290,128   12/1966   Mangannello .......................29/196.1

*Primary Examiner*—Hyland Bizot
*Attorney*—Ward, McElhannon, Brooks & Fitzpatrick

[57] ABSTRACT

Alloy steel welding wire is disclosed as being suitable for welding steels having the composition 0.18 to 0.30 percent carbon, 7.0 to 9 percent nickel, 3.5 to 4.5 percent cobalt, 0.35 to 1.10 percent each of the chromium and molybdenum, 0.10 to 0.35 percent manganese, 0.6 to 0.12 percent vanadium, up to 0.1 percent silicon, up to 0.010 percent each of sulfur and phosphorus, balance iron except for extraneous impurities within commercial tolerances. The alloy steel welding wire has the composition of 0.15 to 0.20 percent carbon, 7.0 to 8.0 percent nickel, 3.0 to 5.0 percent cobalt, 0.5 to 1.0 percent chromium, 0.8 to 1.1 percent molybdenum, 0.4 to 1.25 percent manganese, 0.10 to 0.50 percent silicon, up to 0.1 percent vanadium, up to 0.015 percent each of phosphorus and sulfur, up to 0.05 percent aluminum, up to 0.05 percent of metal of the group titanium and zirconium, balance iron except for impurities within commercial tolerances.

2 Claims, No Drawings

WELDED STEEL ARTICLES BONDED BY A STEEL ALLOY

This is a continuation-in-part of copending application Ser. No. 525,348, filed Feb. 7, 1966 (now abandoned).

This invention pertains to a consumable, ferritic, alloy steel welding wire of novel composition for electric arc welding and to welded articles thereof.

The welding wire of the invention is particularly adapted to the joining by welding of workpieces, such as plates, sheets, pipe, forgings, etc., made of corrosion-resistant, alloy steels known as HP 9–4–25 and HP 9–4–20 Cr, Mo having compositions within the ranges of: 0.30 percent carbon, 7.0–9 percent nickel, 3.5–4.5 percent cobalt, 0.35–1.10 percent each of chromium and molybdenum, 0.10–0.35 percent manganese, 0.06–0.12 percent vanadium, up to 0.1 silicon, up to 0.010 percent each of sulfur and phosphorus, balance iron except for extraneous impurities within commercial tolerances. These steels as hot-worked, normalized, austenitized, quenched and tempered at about 1,000° F., are extremely tough and high-strength steels of excellent ductility, typical mechanical properties for plate of which as thus processed are: ultimate strength, 190,000 to 200,000 p.s.i.; 0.2 percent offset yield strength, 180,000 to 190,000 p.s.i.; tensile elongation in 1 inch, 16 percent; reduction in area, 60 percent and Charpy V notch impact strength, 35 to 55 foot-pounds at 70° F. and 30 to 40 at −80° F. These steels and their processing and heat treatment, are covered by U.S. Pat. No. 3,366,471, assigned to the assignee of the instant application. These steels, owing to their high strength and toughness, are particularly adapted for use in large, unfired, pressure vessels subjected in use to high stresses, such as hydraulic bottles, and also by reason of their corrosion resistance as well, for use in certain chemical pressure vessels and for the hulls of submersible vessels and the like, exposed to sea water.

A serious problem has been encountered, however, in so joining workpieces of these steels, such as plates, sheets and the like, by welding into a fluidtight joint and such as not to impair the strength, ductility and toughness of the steel at the weld seams in the absence of subsequent heat treatment, inasmuch as in the production of large pressure vessels, submersible hulls and the like, such subsequent heat treatment cannot be applied.

Such expedients as spot or pressure welding are obviously not applicable, nor is high-frequency electric current fusion welding, in the joining of heavy plates of these steels. We have found fusion welding to be most suitable wherein workpieces to be joined are welded together by means of a consumable filler or welding wire, rendered molten along the weld seam by means of a tungsten electrode arc operating in an atmosphere or blanket of an inert gas, such as argon, generally designated as "gas tungsten-arc" or "TIG" welding.

The problem here encountered, however, resides in the provision of a consumable filler or welding wire of a composition such as to lay down a weldment that will impart a strength, toughness and ductility at least equal to that of the base metal. The obvious assumption would be that this can be accomplished by employing a filler or welding wire of the same composition as that of the base metal, but our tests have established that this is not so. This is demonstrated by the test results in the following Tables I and II wherein filler wire of the same composition as the base metal was employed in TIG welding of 1-inch and ½-inch plates of the HP 9–4–25 steel, and the Charpy V notch (CVN) values determined in the base metal and in the weld metal, each at 70° and −80° F.

These examples show that the weld metal toughness as evaluated by Charpy V notch impact testing is substantially below that of the base metal and does not meet a desired 50 foot-pound impact value even at room temperature of 70° F.

Data presented in Table III below shown that a filler wire of a composition similar to that of the HP 9–4–25 base plate material with the exception of a higher manganese (0.46 percent) and silicon (0.23 percent) develops properties as deposited in which the Charpy V notch properties at 70° F. are higher than those of the wrought heat-treated, quenched and tempered baseplate although the impact values at −80° F. are almost identical. The yield strength of the as-deposited weld metal is, however, significantly lower than that of the baseplate with, however, a higher tensile strength for the weld metal as compared with that of the baseplate.

TABLE I.—HP 79

Heat 3920563    1″ plate    TIG weld—single U groove

Welded with base plate material as ⅛″ sq. sheared strips

| | Composition—Base plate and filler wire | | | | | | | | |
|---|---|---|---|---|---|---|---|---|---|
| | C | Mn | P | S | Si | Ni | Cr | Mo | V | Co |
| Base plate (Ht 3920563) | .28 | .29 | .005 | .005 | .10 | 8.26 | .53 | .47 | .15 | 3.82 |
| Weld wire | | | | | Same as above | | | | | |

| | Temp., F. | CVN, ft. lb. |
|---|---|---|
| Charpy V notch impact: | | |
| Base Metal [1] | 70 | 50/52 |
| | −80 | 37 |
| Weld metal as deposited | 70 | 36,37 |
| | −80 | 37 |

[1] Oil quenched from 1,550° F. and double tempered at 1,000° F.

TABLE II.—HP 92

Heat V173    ½″ plate    TIG weld—Single U groove

Welded with base plate material as ⅛″ x ⅛″ sq. sheared strips

| | Composition—Base plate and filler wire | | | | | | | | |
|---|---|---|---|---|---|---|---|---|---|
| | C | Mn | P | S | Si | Ni | Cr | Mo | V | Co |
| Base plate | .22 | .35 | | | .22 | 7.7 | .39 | .31 | .08 | 5.1 |
| Weld wire | | | | | Same as above | | | | | |

| | Temp., ° F. | CVN, ft. lb. |
|---|---|---|
| Charpy V notch impact: | | |
| Weld metal | 70 | 42, 38 |
| | −80 | 34, 27 |
| Base metal [1] | 70 | 48, 50 |
| | −80 | 38, 38 |

[1] Oil quenched from 1,550° F. and double tempered at 1,000° F.

TABLE III.—HP 161

Heat 3920874    1" Plate    TIG weld—single U groove

Welded using .062" diameter filler wire, product of Heat 3931006

| | Composition—Base plate, filler wire and weldment | | | | | | | | |
|---|---|---|---|---|---|---|---|---|---|
| | C | Mn | P | S | Si | Ni | Cr | Mo | V | Co |
| Base plate (Ht 3920874) | .28 | .20 | .005 | .008 | .02 | 8.33 | .49 | .49 | .11 | 4.05 |
| Filler wire (3931006) | .26 | .46 | .008 | .006 | .23 | 8.05 | .55 | .52 | .08 | 4.08 |
| Weldment (as deposited) | .25 | .41 | | | .22 | 7.90 | .49 | .53 | .09 | 4.01 |

| | Temp. °F. | CVN, ft. lb. |
|---|---|---|
| Charpy V notch impact: | | |
| Base plate [1] | 70 | 38, 39 |
| | −80 | 33, 34 |
| Weld metal | 70 | 42, 43 |
| | −80 | 35, 35 |

| | Y.S., k.s.i. | UTS, k.s.i. | Elong., percent in 1 inch | Red. area, percent |
|---|---|---|---|---|
| Tensile properties: | | | | |
| Base plate [1] | 193.5 | 207.5 | 13.0 | 58.5 |
| Weld metal | 178.6 | 218.5 | 15.0 | 40.1 |

[1] Oil quenched and double tempered at 1,000° F. Tested in transverse direction.

Our further investigations of the gas tungsten-arc welding of HP 9–4–25 steel of the above composition, led to the development of a consumable alloy steel welding wire which was modified with respect to carbon, manganese, silicon, chromium, molybdenum and vanadium as compared to the composition ranges for these elements, respectively, of the HP 9–4–25 base metal. The compositions thus found to impart the desired characteristics are as follows:

| C | Mn | P | S | Si | Ni | Cr | Mo | V | Co | Bal. |
|---|---|---|---|---|---|---|---|---|---|---|
| .15/.20 | .40/1.25 | [1].015 | [1].015 | .10/.50 | 7.00/8.00 | .50/1.00 | [2].8-1.1 | [3] | 3.00/5.00 | Fe |

[1] Maximum.
[2] Preferably .90/1.10.
[3] Up to 0.10.

Welding test results similar to those of Tables I–III, inc., are given in the following Tables IV, V, VI and VII to demonstrate the improved results thereover obtained by the use of filler or welding wires having compositions within the welding alloy range of the present invention as above set forth.

Tables IV, V and VI, show Charpy V notch impact values for the as-deposited weld metal appreciably in excess of that of the heat treated (quenched and tempered) base metal. This is also true for the tensile properties in these tables as well as in Table VII which exhibit yield and tensile strength for undiluted asadeposited weld metal equal to or greater than those for the baseplate.

Experimental filler wire heats melted within the above-stated composition range of this invention are noted below in Table VIII:

1. Carbon should be no higher than 0.02 percent and preferably somewhat below this (0.15–0.20 percent).
2. The increased manganese and silicon, as compared to the

TABLE IV.—HP 170

Heat 3920874    1" plate    TIG weld–single U groove

Welded using .125" diameter wire, product of Heat 3888697

| | Composition—base plate, filler wire and weldment | | | | | | | | |
|---|---|---|---|---|---|---|---|---|---|
| | C | Mn | P | S | Si | Ni | Cr | Mo | V | Co |
| Base Plate (3920874) | .28 | .20 | .005 | .008 | .02 | 8.33 | .49 | .49 | .11 | 4.05 |
| Filler wire (3888697) | .19 | 1.14 | .008 | .005 | .16 | 7.20 | .99 | .93 | .09 | 4.72 |
| Weldment (as deposited) | .18 | 1.10 | | | .12 | 8.0 | .94 | .98 | .09 | 4.60 |

| | Temp., F. | CVN, ft. lb. |
|---|---|---|
| Charpy V notch impact: | | |
| Base plate [1] | 70 | 40 |
| | −100 | 34 |
| Weld metal | 70 | 51, 52, 53 |
| | −80 | |

| | Y.S., k.s.i. | UTS, k.s.i. | Elong., percent in 1 inch | Red area, percent |
|---|---|---|---|---|
| Tensile properties: | | | | |
| Base plate [1] | 193.5 | 207.5 | 13.0 | 58.5 |
| Weld metal | 202.3 | 223.5 | 19.0 | 59.7 |

[1] Oil quenched and double tempered at 1,000° F. Tested in transverse direction.

TABLE V.—HP 191

Heat 3921021    1" Plate    TIG weld—single U groove

Welded using .062" diameter wire, product of Heat 3888723

| | Composition—base plate, filler wire and weldment | | | | | | | | |
|---|---|---|---|---|---|---|---|---|---|
| | C | Mn | P | S | Si | Ni | Cr | Mo | V | Co |
| Base plate (3921021) | .27 | .30 | .005 | .008 | .01 | 8.29 | .39 | .49 | .08 | 3.92 |
| Filler wire (3888723) | .18 | .74 | .004 | .005 | .35 | 7.25 | .55 | .96 | .09 | 3.25 |
| Weldment (as deposited) | .16 | .60 | | | .36 | 7.3 | .52 | .83 | .09 | 3.30 |

| | Temp. °F. | CVN,[1] ft. lb. | CVN,[1] ft. lb. |
|---|---|---|---|
| Charpy V notch impact: | | | |
| Base plate [2] | 70 | 46, 48 | 51, 52 |
| | 30 | 42, 45 | 50, 49 |
| | −80 | 42, 42 | 43, 44 |

TABLE V.—HP 191—Continued

Heat 3921021    1″ Plate    TIG weld—single U groove

Welded using .062″ diameter wire, product of Heat 3888723

|  | Temp. °F. | CVN,[1] ft. lb. | CVN,[1] ft. lb. |
|---|---|---|---|
| Weld metal | 70 | 62, 66 |  |
|  | 30 | 62, 63 |  |
|  | −80 | 54, 56 |  |

|  | Y.S. k.s.i. | UTS, k.s.i. | Elong., percent in 1 inch | Red area percent |
|---|---|---|---|---|
| Tensile properties[3]: |  |  |  |  |
| Base[2] | 186.5 | 198.0 | 14.0 | 54.5 |
| Weld metal | 203.2 | 211.1 | 20.0 | 65.0 |

[1] Tempered 1,100° F. (4 hrs.).
[2] Base tempered at 1,000° F. (2+2 hrs.).
[3] Base properties from 4 × 4 forged billet—transverse.

TABLE VI.—HP 184

Heat 3930774    2¼″ Plate    TIG Weld—single U groove

Welded using .045″ diameter wire, product of Heat 3888652

| Composition—base plate and filler wire | C | Mn | P | S | Si | Ni | Cr | Mo | V | Co |
|---|---|---|---|---|---|---|---|---|---|---|
| Base Plate (3930774) | .25 | .32 | .004 | .007 | .01 | 7.19 | 1.01 | 1.03 | .09 | 3.90 |
| Filler wire (3888652) | .21 | .42 | .008 | .007 | .15 | 7.31 | 1.04 | .97 | .025 | 3.87 |

|  | Temp., °F. | CVN, ft. lb. |
|---|---|---|
| Charpy V notch impact: |  |  |
| Base Plate[1] | 70 | 48 |
| Weld metal | 70 | 65 |
|  | 30 | 63 |
|  | −80 | 58 |

|  | Y.S., k.s.i. | UTS, k.s.i. | Elong., percent in 1 inch | Red. area, percent |
|---|---|---|---|---|
| Tensile properties: |  |  |  |  |
| Base plate[1] | 185 | 210 | 15 | 60 |
| Weld Metal | 203.2 | 213.6 | 16 | 55 |

[1] Oil quenched and double tempered at 1,000° F.

TABLE VII.—HP 284

Heat 3931677    1″ plate    TIG weld—single U groove

Welded using commercially produced .062″ diameter filler wire—Heat 60320 (1 ton vacuum induction heat product)

| Composition—base plate, filler wire and weldment | C | Mn | P | S | Si | Ni | Cr | Mo | Co | V |
|---|---|---|---|---|---|---|---|---|---|---|
| Base Plate (3931677) | .17 | .28 | .003 | .005 | .02 | 9.10 | .77 | 1.00 | 4.45 | .08 |
| Filler wire (60320) | .16 | .75 | .003 | .005 | .23 | 7.33 | .45 | .94 | 3.34 | .09 |
| Weldment (as deposited) | .15 | .65 |  |  | .22 | 7.40 | .54 | .94 | 3.30 | .09 |
| Charpy V notch impact (70° F.): |  |  |  |  |  |  |  |  |  |  |
| Base plate[1] |  |  |  |  |  | 59/65 ft.-lb. |  |  |  |  |
| Weld metal (as deposited, undiluted) |  |  |  |  |  | 63/63 ft.-lb. |  |  |  |  |

|  | Y.S. k.s.i. | UTS, k.s.i. | Elong., percentage in 1 inch | Red. area, percentage |
|---|---|---|---|---|
| Tensile Properties: |  |  |  |  |
| Base plate[1] | 185.4 | 198.6 | 18.0 | 69.0 |
| Weld metal (as deposited, undiluted) | 186.7 | 207.2 | 17.0 | 59.3 |

[1] Quenched and tempered base plate tempered at 1,000/1,025° F.—4 hrs. at temperature

TABLE VIII

| Heat | C | Mn | P | S | Si | Ni | Cr | Mo | V | Co |
|---|---|---|---|---|---|---|---|---|---|---|
| 3888723 | .18 | .74 | .004 | .005 | .35 | 7.25 | .55 | .96 | .09 | 3.25 |
| 3888697 | .19 | 1.14 | .008 | .005 | .16 | 7.20 | .99 | .93 | .09 | 4.72 |
| 3888652 | .21 | .42 | .008 | .007 | .15 | 7.31 | 1.04 | .97 | .025 | 3.87 |
| A959 | .15 | .86 | .006 | .006 | .29 | 6.98 | .98 | .94 | .034 | 2.98 |

With respect to the above compositions the following points are to be emphasized:

baseplate composition, serves to enhance the usability of the filler wire and to provide suitable deoxidation for the molten weld metal during deposition. Also, in this regard, small amounts of aluminum, i.e., up to about 0.05 max., serve to act as a deoxidizer and reduce porosity of the weldment.

3. No specific effects have been observed with regard to the vanadium levels noted. It is considered, however, that a lower vanadium content will be beneficial if stress-relieving is required for certain applications after welding.

4. Minor amounts of titanium and zirconium may be added up to about 0.05 max.) to improve toughness.

What is claimed is:

1. A welded article comprising base metal components made of an alloy steel consisting essentially of about 0.18 to 0.30 percent carbon, 7 to 9 percent nickel, 3.5 to 4.5 percent cobalt, 0.35 to 1.10 percent each of chromium and molybdenum, 0.1 to 0.35 manganese, up to 0.12 percent vanadium, up to 0.1 percent silicon, and the balance substantially all iron, said base metal components being welded together by an alloy consisting essentially of about 0.15 to 0.20 percent carbon, 7.0 to 8.0 percent nickel, 3.0 to 5.0 percent cobalt, 0.5 to 1.0 percent chromium, 0.8 to 1.1 percent molybdenum, 0.4 to 1.25 percent manganese, 0.10 to 0.50 percent silicon, up to 0.1 percent vanadium, up to 0.015 percent each of phosphorus and sulfur, up to 0.05 percent of metal of the group titanium and zirconium, balance iron except for impurities within commercial tolerances.

2. A welded article comprising base metal components made of alloy steel consisting essentially of about, 0.18 to 0.30 percent carbon, 7 to 9 percent nickel, 3.5 to 4.5 percent cobalt, 0.35 to 1.1 percent of each of chromium and molybdenum, 0.1 to 0.35 percent manganese, up to 0.12 percent vanadium, up to 0.1 percent silicon, and the balance iron, said base metal components being welded together by an alloy consisting essentially of about, 0.15 to 0.2 percent carbon, 7 to 8 percent nickel, 3.0 to 3.5 percent cobalt, 0.5 to 1.0 percent chromium, 0.9 to 1.1 percent molybdenum, 0.15 to 0.50 percent silicon, up to 0.1 vanadium, up to 0.015 percent each of phosphorus and sulfur, up to 0.05 percent aluminum, up to 0.05 percent of metal of the group titanium and zirconium, balance iron, said article having in the welded portion, yield and ultimate strengths of at least 185 and 200 k.p.s.i., respectively, a tensile elongation in 1 inch of at least 13 percent, and a Charpy "V" notch impact strength of at least 50 foot-pounds at 70°F.

* * * * *